United States Patent Office 2,770,921
Patented Nov. 20, 1956

2,770,921

SOIL CONDITIONING

Lyle D. Goodhue, Bartlesville, Okla., assignor to Phillips Petroleum Company, a corporation of Delaware No Drawing. Application January 24, 1955,
Serial No. 483,833

4 Claims. (Cl. 47—58)

This invention relates to soil conditioning. In another aspect, it relates to soil conditioners which have a beneficial toxic effect for a limited period of time and thereafter impart increased fertility to the soil. In another aspect, the invention relates to a method of making a soil conditioner and applying it to the soil.

Heretofore, many various materials have been proposed for application to the soil as conditioners. Many of these materials have been too expensive for practical application and the improvement in soil structure is rather temporary in nature. More recently, various polymeric materials have been proposed as soil conditioners. Here again, in many instances, these polymers are too expensive for practical use on a commercial scale, and certain such materials have poisoning effects upon the soil which are of extended duration.

In accordance with this invention, a conditioner of improved character is provided which is very inexpensive, and causes soils to which it is applied to develop a good structure, thus increasing the agricultural yields and minimizing the erosion of the exposed surfaces of these soils. In particular, the conditioners of this invention are characterized in that they provide a toxic effect for a limited period and thereafter actually increase the fertility of the soil as a result of an inherent fertilizing action. Thus, the conditioners of the invention permit germinating seeds of undesirable growth to be killed, and improved yields of a desired crop after the toxic effect has terminated with improvement of the soil structure and subsequent increased fertility.

The soil conditioners of the invention are condensation products of the catalytic or non-catalytic reaction of ammonia and an organic aldehyde or ketone condensable with ammonia to form substituted pyridines, more particularly, the fraction of such condensation product boiling within the range of 185 to 900° C. at atmospheric pressure. In one commercially important embodiment, the fraction of desired boiling range is obtained from the condensation product of ammonia and paraldehyde, and is the heavy residue remaining after separation of 2-methyl-5-ethylpyridine and lower boiling materials from the condensation product.

The aforesaid fraction has the physical characteristics of a heavy viscous oil, and can be applied directly to the soil to produce the aforementioned conditioning action. More advantageously, however, the conditioner material is admixed with water to form an emulsion, and this emulsion is applied to the soil with concomitant tilling or agitation thereof, as by a rototiller.

In one case several adjacent plots were treated with various soil conditioners, including the aforementioned heavy residue and certain commercially available materials. These plots were immediately planted with oat seeds, the soil conditioner and seed being worked into the soil with a rotary tilling device simultaneously. On the plot treated with the conditioner of the invention, germination of the oats did not occur although on those treated with other conditioners satisfactory emergence of the oats was realized. About two weeks later the plot treated with the heavy residue of the invention was replanted with oats. Germination was fairly satisfactory considering weather conditions which were extremely adverse and development of the crop was unsatisfactory. In view of the poor development of the oat crop, small test plantings of radishes were made about a month subsequent to the treatment of the soil. Satisfactory germination of the radish seeds was observed.

Aside from the foregoing, the plot remained fallow most of the season because of extremely hot and dry weather.

The following season oats were again planted in this same group of plots and the weather conditions were conducive to normal growth of seeds and plants. During this latter season it was observed that the oats on the plot treated with the product of this invention were much darker green and substantially taller than on adjacent plots treated with the commercial soil conditioners. This is particularly surprising in view of the fact that one of the commercial soil conditioners used as a control contained a fertilizing component. In addition, in the plot treated with the composition of this invention, the soil appeared to be less packed than it was in the adjacent plots, it being possible to push the fingers into the loose soil to a depth of about six inches.

It will be seen, therefore, that agricultural yields from fields can be increased by the use of the soil conditioners of this invention, the bulk density of the soil can be reduced, the water retention capacity of the soil can be increased, the soil's permeability to air and water enhanced, and resistance to erosion improved.

In preparing the soil conditioners of the invention, ammonia is condensed with aldehydes or ketones having no more than six carbon atoms per molecule, such as acetaldehyde, crotonaldehyde, paraldehyde, butyl ethyl ketone, n-capronaldehyde, or acetone. Mixtures of the described aldehydes and ketones can be employed.

The ammonia can be anhydrous liquid ammonia or an aqueous solution of ammonia containing 10 to 90 weight percent thereof.

The condensation reaction is carried out at temperatures within the range of 300 to 650° F., preferably 450 to 550° F., in the liquid phase and, consequently, with pressures sufficient to maintain the reaction mixture in the liquid phase, these pressures usually being within the range of 850 to 2500 pounds per square inch gauge. The reaction period varies from 5.0 minutes to 5.0 hours and is usually complete before 2.0 hours has elapsed. Good yields can be obtained by cooling the reaction mixture, as soon as the desired reaction temperature has been obtained.

The mol ratios of ammonia to aldehyde or ketone undergoing condensation are within the range of 1:1 to 12:1, the range of 2:1 to 10.5:1 being especially advantageous for commercial operation.

It will be understood that the foregoing conditions are given for the guidance of those skilled in the art. Since the particular conditions of the condensation reaction are not of the essence of this invention, it is to be understood that operation outside the foregoing ranges of temperature, pressure, time, concentration, and ratio of ammonia to aldehyde or ketone is comprehended within the broader aspects of the invention.

The condensation reaction can be carried out catalytically or non-catalytically. Where a catalyst is utilized, an amount of 0.1 to 10.0 weight per cent based on the total stream is employed, 0.2 to 0.5 percent being most suitable for commercial operation. Catalysts which can be employed are fluorine-containing materials, ammonium halides, such as the chloride, and iodide, nickel chloride, copper chloride, copper iodide, nickel iodide, and various other catalytic materials known in the art to catalyze this reaction. In particular, the fluorine-containing catalysts which are most suitable are ammonium fluoride, ammonium bifluoride, boron trifluoride, boron trifluoride-ammonia complex, boron trifluoride amine complexes, salts of fluoroboric acid, salts of the fluophosphoric acids, salts of trifluoroacetic acid, and salts of fluosilicic acid, compounds containing a sulfur-fluorine linkage, such as ammonium fluosulfonate and sulfur hexafluoride, lithium fluoride, bifluorides of the group I–A metals, salts of hydrofluoric acid with 2-methyl-5-ethyl-pyridine, guanidine and the like, metal fluorides, such as antimony, copper, bismuth, zinc, iron and barium fluoride, sulfonic acid and salts thereof, such as aryl, alkyl, aralkyl and alkaryl sulfonic acids. The catalysts can be used alone or with 0.01 to 5 percent by weight based on the total stream of a synergistic agent, such as a phosphate glass, specifically sodium hexametaphosphate.

The effluent from the described condensation reaction is treated to separate ammonia from the reaction products, and fractionated to produce a fraction boiling within the range of 185 to 900° C. at atmospheric pressure. If desired the residue boiling above 185° C. can be further separated into various fractions by distillation or other suitable means and one or more of these individual fractions can be applied as the soil conditioning agent. This material is applied directly to the soil as a conditioning agent, the amount used varying from 50 to 3000 pounds per acre, depending upon the degree of conditioning necessary, the previous condition of the soil, the nature of the crop to be planted, and the duration of the desired toxic action.

Depending upon the amount of conditioning agent applied, the duration of the toxic action can be from 1 month to 1 year, the action being of longer duration with a higher concentration of conditioning material. At the end of this period, the toxic action dies out, and an improved fertility of the soil is noted which becomes more pronounced for a period following the cessation of the toxic effect. I believe that this improved fertility is caused by conversion of nitrogen present in the conditioning agent to a form which can be readily assimilated by the crop.

Application of the conditioning agent within the amounts specified reduces the bulk density of the soil, reduces both wind and water erosion, increases the permeability of the soil to air and water, and increases the water retention capacity of the soil. In some instances, however, improved results can be obtained utilizing less than the specified quantity of the conditioning material, particularly where the conditioning material is applied periodically in relatively small amounts following an initial large application.

Particularly advantageous results are obtained where the conditioning agent is admixed with water to form an emulsion, and this emulsion is applied to the soil which is agitated or tilled during the application. This provides a thorough and effective mixing of the soil and conditioning agent with resultant acceleration of the described toxic action, and improvement of the rapidity with which the desirable soil condition is obtained.

In making such emulsion, the amount of the conditioning agent is from 5 to 75 per cent by weight of the emulsion.

The practice of the invention is further exemplified by the following experimental data:

EXAMPLE I

A soil conditioning agent in accordance with the invention was prepared by reacting paraldehyde and aqueous ammonia (33.1 weight per cent ammonia) in the presence of an ammonium bifluoride catalyst which was present in an amount of 0.63 per cent by weight based on the total stream together with 0.10 percent by weight of sodium hexametaphosphate, based on the total stream. The mol ratio of ammonia to paraldehyde was 10:1, and the condensation reaction was carried out at a temperature of 500° F. with sufficient pressure to maintain a liquid phase, the actual pressure varying between 1900 and 2000 pounds per square inch gauge. The time of contact was about eighteen minutes.

Ammonia was flashed from the reaction effluent, and then additional quantities of ammonia were stripped therefrom. The product was fractionated to separate 2-methyl-5-ethylpyridine and lower boiling materials, thus providing a heavy viscous material boiling within the range of 185 to 900° C. which was utilized as a soil conditioning agent.

EXAMPLE II

A water wash test was run by the wet-sieve method to determine the hydraulic stability of the soil samples which had been treated with 2000 pounds per acre of the soil conditioning material of Example I. 25 grams of dry soil was placed in a standard 8-inch diameter 200-mesh sieve. The sieve was then placed in a water filled vessel in which the water level was adjusted to reach about ¼ inch above the wire screen. Water was then allowed to flow downward through the sieve at a rate of 2 liters per minute for 15 minutes. The water was introduced into the sieve through a horizontal T connection in order to prevent direct impingement of the stream upon the soil sample. The sieve was shaken gently every few minutes during the washing process to redistribute the soil over the screen and permit escape of fine particles. At the end of the washing period, the residue on the screen was flushed into a Buechner funnel, allowed to drain free of water, dried at room temperature, and weighed. A control on untreated soil was also run by this method.

The treated and untreated soils were tested for freeze-thaw stability by wetting the samples and placing them in a deep freeze and allowing the samples to freeze solid. The samples were then removed from the deep freeze and allowed to thaw completely at room temperature without evaporation of water. This freeze-thaw cycle was repeated four times, after which the loss in weight by the above described wet-sieve method was determined. The results of these tests are tabulated below and are expressed as the percentage of weight lost.

*Table I*

| Sample | Subjected to Freeze-Thaw, Wt. Percent Lost | Not Subjected to Freeze-Thaw, Wt. Percent Lost |
| --- | --- | --- |
| 1 (Treated with Residue Fraction from Example I) | 62 | 54 |
| 2 (Untreated) | 72 | 63 |

Thus, under both conditions the weight loss was very substantially decreased by the conditioning agent of the invention.

EXAMPLE III

The treated and untreated soil samples were subjected to a wet-dry stability test to determine their resistance to break down caused by cyclic wetting and drying. 25 gram samples were wet thoroughly and then oven dried. The samples were then wet for 15 minutes with 25 cubic centimeters of water and again oven dried. The 25 cubic centimeter wettings followed by oven drying were repeated four times, after which the samples were tested by the wet-sieve method of Example II. To allow for variation of the samples, a portion of samples tested in this wet-dry stability test were tested by the wet-sieve method only. The results of these tests are tabulated below. These samples were treated at the rate of 2000 pounds of conditioning material of Example I per acre.

Table II

| Sample | Wt. Percent Lost, Wet-Dry Cycle | Wt. Percent Lost, No Wet-Dry Cycle |
|---|---|---|
| 1 (Treated with MEP Residue) | 58 | 54 |
| 2 (Treated with Flotal)[1] | 68.8 | 68.9 |

[1] A commercial conditioner containing an iron ammonia complex as the active ingredient.

EXAMPLE IV

Various fractions of the foregoing soil conditioning agent were separated by fractional distillation, and applied to test plots. These fractions improved the structure of the soil, and increased the resistance to erosion of the soil when applied in amounts within the range of 50 to 2000 pounds per acre.

EXAMPLE V

The soil conditioning agent of Example I is applied to the soil directly without formation of a water emulsion, with resultant decrease of bulk density of the soil. The water retention capacity of the soil is increased, the soil's permeability to air and water is improved, and an improvement in resistance to erosion is noted. The toxic effect of the conditioning agent is less pronounced when applied directly than when applied as an aqueous emulsion, and a longer period is required for improvement in fertility of the soil.

While the invention has been described in connection with a present, preferred embodiment thereof, it is to be understood that this description is illustrative only and is not intended to limit the invention.

I claim:

1. A method of improving the condition of a soil which comprises applying to the soil an amount sufficient to condition the soil of a conditioning agent, said conditioning agent being a fraction boiling within the range of 185 to 900° C. consisting of the effluent from the condensation reaction of ammonia with a carbonyl compound selected from the group consisting of acetalydehyde, crotonaldehyde, paraldehyde, butyl ethyl ketone, n-capronaldehyde, and acetone.

2. The method of improving the condition of a soil which comprises applying to the soil from 50 to 3000 pounds per acre of a soil conditioning agent, said agent being the effluent of the condensation reaction of paraldehyde with ammonia boiling within the range of 185 to 900° C. at atmospheric pressure.

3. A method of improving the condition of a soil which comprises forming a water emulsion of a conditioning agent consisting of the effluent from the condensation reaction of paraldehyde and ammonia boiling within the range of 185 to 900° C., applying said emulsion to the soil with concomitant tilling of the soil in an amount sufficient to provide 50 to 3000 pounds per acre of said conditioning agent.

4. The method of conditioning a soil which comprises forming a water emulsion of a conditioning agent consisting of the effluent from the condensation reaction of ammonia and paraldehyde boiling within the range of 185 to 900° C., applying said emulsion to the soil to be conditioned with concomitant tilling in an amount sufficient to provide 50 to 3000 pounds per acre of said conditioning agent, whereby a toxic effect is produced to plant organisms in the soil, and planting a crop in said soil after termination of said toxic effect, whereby the size and color of the crop is improved through the fertilizing action of said conditioning agent, and the condition of the soil is improved.

References Cited in the file of this patent

Chem. Abstracts, vol. 17, pub. 1923, p. 1684, article "The Effect of Hexamethylenetetramine on Plant Production."

Tschitschibabin: J. prakt. Chem. (Leipzig, Germany), New Series, vol. 107, pp. 122–158 (1924).

Chem. Abstracts, vol. 18, p. 2495 (1924).

Chem. Abstracts, vol. 19, p. 1724 (1925), article "Hexamethylenetetramine as Fertilizer."

Traub: "Growth Substances," pub. April 1938 in Proc. Am. Soc. Hort. Sci. for 1937, vol. 35, pp. 438–442.

Chem. Abstracts, vol. 45, col. 7735–E (1951), article, "The Fertilizing Action of Hexamethylenetetramine."

Kingzett's Chemical Encyclopedia, pub. 1952 by Bailliere, Tindall & Cox (London) 8th ed., p. 529.